(12) United States Patent
Andersson

(10) Patent No.: US 7,900,048 B2
(45) Date of Patent: Mar. 1, 2011

(54) METHOD FOR LOADING AN APPLICATION IN A DEVICE, DEVICE AND SMART CARD THEREFOR

(75) Inventor: Stefan Andersson, Klågerup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 968 days.

(21) Appl. No.: 10/513,833

(22) PCT Filed: Apr. 16, 2003

(86) PCT No.: PCT/EP03/03976

§ 371 (c)(1),
(2), (4) Date: Nov. 8, 2004

(87) PCT Pub. No.: WO03/096238

PCT Pub. Date: Nov. 20, 2003

(65) Prior Publication Data

US 2005/0234825 A1    Oct. 20, 2005

Related U.S. Application Data

(60) Provisional application No. 60/381,157, filed on May 16, 2002.

(30) Foreign Application Priority Data

May 7, 2002   (EP) .................................. 02445054

(51) Int. Cl.
*G06F 9/44* (2006.01)
*H04L 9/00* (2006.01)

(52) U.S. Cl. .................. 713/175; 713/167; 705/51; 726/9

(58) Field of Classification Search .............. 713/156, 713/713, 173, 167, 175; 705/51; 726/9, 726/18–20; 717/173
See application file for complete search history.

(56) References Cited

U.S. PATENT DOCUMENTS 5,343,527 A  *  8/1994 Moore ...................... 713/179

(Continued)

FOREIGN PATENT DOCUMENTS

DE          19911221 A1    9/2000

(Continued)

OTHER PUBLICATIONS

Howard, Peter, "USECA, UMTS Security Architecture," Ch. 1-3, 1999.

(Continued)

*Primary Examiner*—Benjamin E Lanier
*Assistant Examiner*—Hadi Armouche
(74) *Attorney, Agent, or Firm*—Myers Bigel Sibley & Sajovec

(57) ABSTRACT

An application is loaded into a device, such as downloading an application into a portable device, such as a mobile telephone, by downloading the application with a signature to the device. The signature of the application is coupled to a predefined attribute certificate stored in the device. The application and said attribute certificate are then installed together. The signature of the application may be coupled to a root certificate that in turn links the application to a predefined attribute certificate.

23 Claims, 2 Drawing Sheets

U.S. PATENT DOCUMENTS

| | | | | |
|---|---|---|---|---|
| 5,412,717 | A | * | 5/1995 | Fischer ........................ 713/156 |
| 5,659,616 | A | * | 8/1997 | Sudia ........................... 705/76 |
| 5,671,279 | A | * | 9/1997 | Elgamal ....................... 705/79 |
| 5,712,914 | A | * | 1/1998 | Aucsmith et al. ............. 380/30 |
| 5,796,841 | A | * | 8/1998 | Cordery et al. ............... 380/55 |
| 5,825,877 | A | * | 10/1998 | Dan et al. ..................... 705/54 |
| 5,878,144 | A | * | 3/1999 | Aucsmith et al. ............. 380/30 |
| 5,884,158 | A | * | 3/1999 | Ryan et al. ................... 455/410 |
| 5,892,904 | A | | 4/1999 | Atkinson et al. ....... 395/187.01 |
| 5,903,878 | A | * | 5/1999 | Talati et al. ................... 705/26 |
| 5,987,440 | A | * | 11/1999 | O'Neil et al. ................. 705/44 |
| 6,367,012 | B1 | * | 4/2002 | Atkinson et al. ............. 713/176 |
| 6,505,300 | B2 | * | 1/2003 | Chan et al. ................... 713/164 |
| 7,133,845 | B1 | * | 11/2006 | Ginter et al. .................. 705/51 |
| 2002/0026578 | A1 | | 2/2002 | Hamann et al. ............. 713/159 |

FOREIGN PATENT DOCUMENTS

| | | |
|---|---|---|
| GB | 2365561 A | 2/2002 |
| WO | WO 00/59225 | 10/2000 |

OTHER PUBLICATIONS

ETSI Standard TS 123057 v 4.5.0, Ch. 8, "Security," Mar. 2002.
RSA Laboratories: "PKS#15 v1.1: Cryptographic Token Information Syntax Standard," RSA Standard, Jun. 6, 2000.
International Search Report dated Aug. 19, 2003 for corresponding PCT application No. PCT/EP03/03976.

* cited by examiner

METHOD FOR LOADING AN APPLICATION IN A DEVICE, DEVICE AND SMART CARD THEREFOR

The present application is a 35 U.S.C. §371 national phase application of PCT International Application No. PCT/EP03/03976, having an international filing date of Apr. 16, 2003, and claiming priority to European Patent Application No. 02445054.6, filed May 7, 2002 and U.S. Provisional Application No. 60/381,157 filed May 16, 2002, the disclosures of which are incorporated herein by reference in their entireties. The above PCT International Application was published in the English language and has International Publication No. WO 03/096238 A1.

FIELD OF THE INVENTION

The present invention relates to a method for loading an application into a device, and more particularly control of the application's interface with the device. The invention also relates to such a device and a smart card usable in such a device.

STATE OF THE ART

WO 00/59225 and U.S. Pat. No. 6,223,291 B1 disclose a secure wireless electronic-commerce system with wireless network domain. The system comprises a wireless network operator certification authority having a root public key certificate and at least one attribute authority having a digital certificate that is dependent from the root public key certificate. The attribute authority is accessible by a wireless client device via a wireless network. The digital certificate is delivered from the attribute authority to the wireless device. The attribute authority is verified to the wireless client device using the digital certificate and the root public key certificate preloaded in the wireless client device under authority of the wireless network operator. An attribute is delivered to the wireless client device over the wireless network and ultimately enabled at the wireless client device.

A problem with this kind of system is that attributes are delivered over the wireless network requiring more steps and contacts before an application using the attribute may be installed in the device.

According to the present invention, generic attribute certificates are preloaded in the device. An attribute certificate is linked to an application using a signature and a certificate chain of the downloaded application.

SUMMARY OF THE INVENTION

According to a first aspect of the invention, there is provided a method for loading an application in a device.

The method includes the steps of:
downloading the application with a signature to the device;
coupling the signature of the application to a predefined attribute certificate stored in the device;
installing the application coupled to said attribute certificate.

Preferably, the signature of the application is coupled to a root certificate which in turn is linking the application to a predefined attribute certificate.

According to a second aspect of the invention, there is provided a device comprising: means for storing and executing an application in connection with function units, the access of which is controlled through an interface unit.

The device further includes or is connectable to:
means for storing at least one predefined attribute certificate capable of being linked to the application for controlling the interface unit.

Preferably, the predefined attribute certificate is linked to a root certificate also stored in the device.

The device may be a mobile telephone.

According to a third aspect of the invention, there is provided a smart card connectable to a device, the device comprising: means for storing and executing an application in connection with function units, the access of which is controlled through an interface unit.

The smart card includes: means for storing at least one predefined attribute certificate capable of being linked to the application for controlling the interface unit.

Preferably, the predefined attribute certificate is linked to a root certificate also stored in the smart card.

BRIEF DESCRIPTION OF THE DRAWINGS

The invention will be described below with reference to the accompanying drawings, in which.

DETAILED DESCRIPTION OF PREFERRED EMBODIMENTS

The invention relates generally to downloading of applications into portable devices, typically mobile telephones. The user may wish to download new functions or applications, such as tools and games and generally content items, to upgrade the telephone. The applications may be provided by third-party developers, independent from the original telephone manufacturer. For warranty and safety reasons, the user, and often the telephone manufacturer, want to control that the telephone is not rendered inoperable or is damaged by the new application. As is discussed above, a system has been devised in which the authenticity of the application may be checked by means of digital signatures appended to the application, and attribute certificates are downloaded as well to control that the application only is allowed limited access to existing hardware and software through an interface, often called API (Application Programming Interface) in the device.

The debiting and authentication of the user himself forms no part of the invention.

Figure 1:
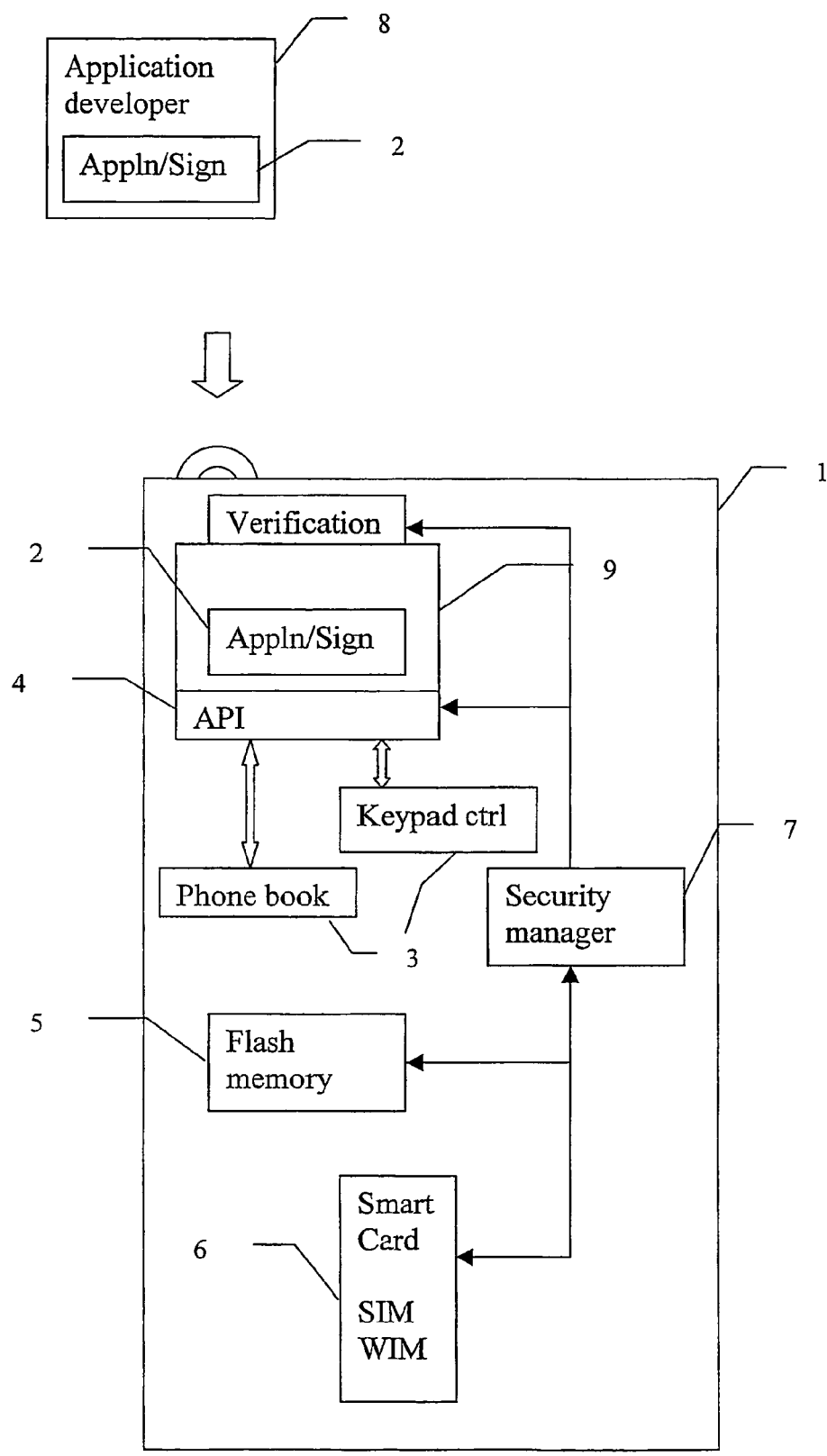
FIG. 1 is a schematic view of a device according to the invention in a wireless environment.

In FIG. 1, a device 1 according to an embodiment of the invention is illustrated in a wireless environment. The device may typically be a mobile telephone. Only parts relevant to the invention are shown, while other conventional parts are omitted, such as keypads, radio interfaces etc.

The wanted application 2 is to be installed in an execution environment 9, typically a JAVA environment. The application 2 is supplied by an application developer 8 through the air as symbolised by the arrow.

When the application is installed it will have limited access through an interface unit (API) 4 to function units 3 of the device, such as a phone book or keypad control unit. The application may e.g. be a game, in which the keypad should be controlled in a special manner. In this case the interface unit 4 should allow access to the function unit 3 controlling the keypad. It is desired that the application has limited access right, as small as possible, in order not to interfere with functions that are not used by the application. Of course, the access right varies for different applications.

A security manager 7 checks the verification of the downloaded application and also controls the access rights in the interface unit 4. The access rights are defined by preloaded attribute certificates as is discussed below.

The attribute certificates as well as root certificates are stored in the device either in built-in memories, such as a flash memory 5 or in a smart card 6, connectable to the device 1. A typical example of a smart card in a mobile telephone is a SIM (Subscriber Identity Module) card. The card contains subscriber identity and authentication information and there is also room for storing various user data. The card may also contain a WIM part, a WAP (Wireless Application Protocol) identity module that provides an interface for services relating to wireless Internet as well as data storage services. The smart card preferably uses PKCS#15 (Public Key Cryptography Standard# 15) for object formats. PKCS#15 defines e.g. a file structure on the card.

Figure 2:
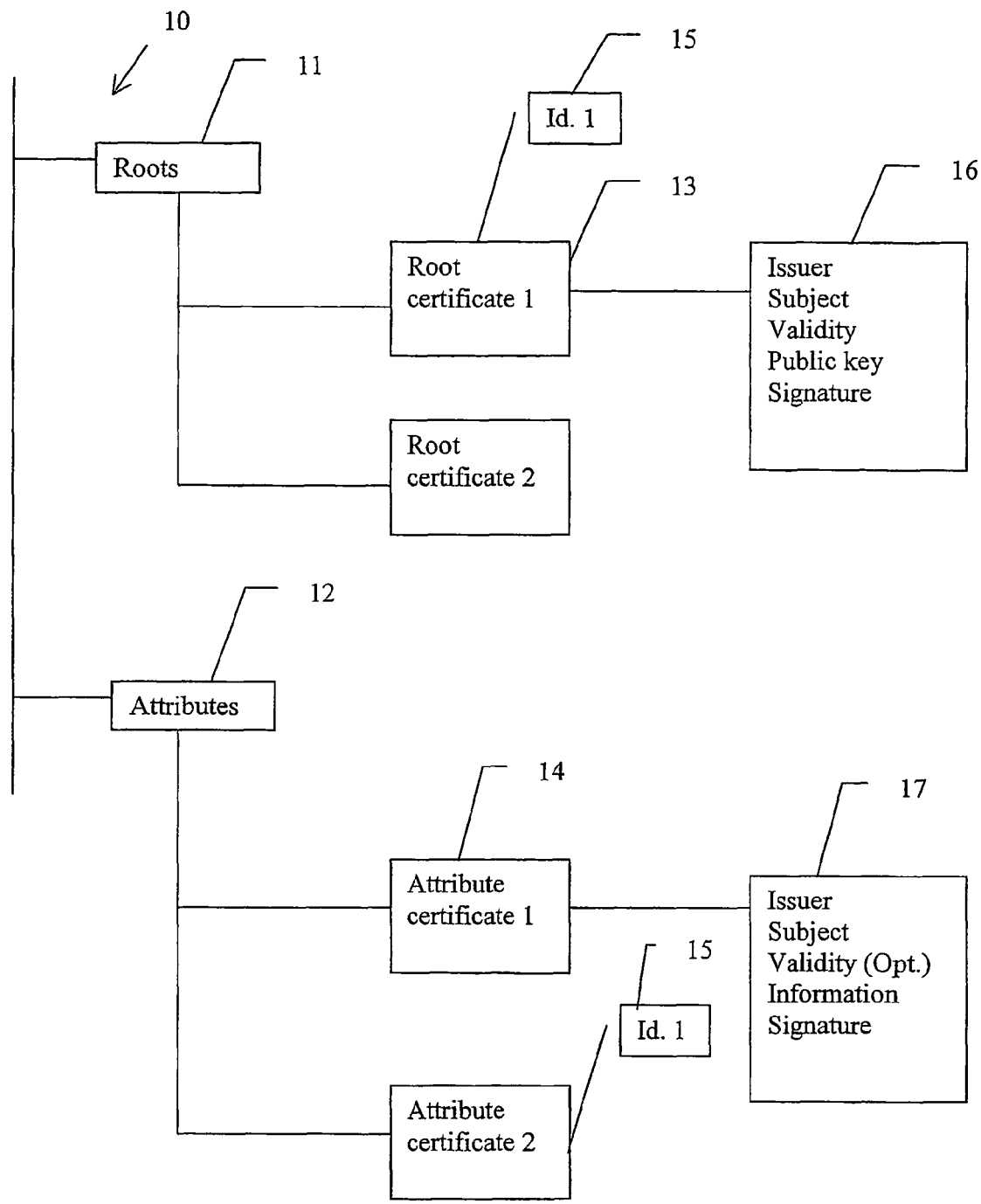
FIG. 2 is a schematic illustration of the structure of the storage of the various certificates.

FIG. 2 illustrates an example of a file structure 10 in accordance with the present invention. Root certificates 13 are stored under a catalogue 11 containing all the roots. A root certificate is a public key certificate issued by a certificate authority. A possible structure of a root certificate is shown in box 16. It contains at least information about the issuer, the subject, a validity period, a public key and a signature. In a root certificate the issuer and subject fields have the same value. The digital signature is created by means of the private key associated with the public key and may be used to verify signatures.

Similarly, the attribute certificates 14 are stored under a catalogue 12 containing all the attributes. A possible structure of an attribute certificate is shown in box 17. The attribute certificate contains at least information about the issuer, subject, validity (optional), and a signature and for the purpose of the present invention information about access rights. In other words, the attribute certificate defines a generic profile for controlling the interface 4 in connection with one or several applications to be associated with the profile.

Each root certificate 13 is associated with one attribute certificate 14. In one embodiment a file property of each root certificate 13 contains an identifier field 15 having a specific value. Also, the attribute certificate files 14 contain the same type of file property identifier field 15. When a specific root certificate is selected, the associated attribute file is found by comparing the identifier fields until a match is obtained, i.e. the identifier fields have the same value. In FIG. 2, Root certificate 1 is associated with Attribute certificate 2.

A 20 byte public key SHA-1 hash may be used as an identifier. The hash value could be stored in PKCS#15 Common Data Object Attributes.iD field.

An example of the procedure for downloading an application into a device is described below. The mobile user finds, e.g. in a browsing session on the Internet, an application from a developer 8. The user downloads the application 2 with a signature and a certificate chain. The security manager 7 takes the signature and follows the certificate chain back to the root certificate stored in the device. The signature verifies the authenticity of the application, if it matches the root certificate.

The identifier 15 of the root certificate 13 is retrieved from the file structure 10. The corresponding attribute certificate 14, having the same value in the identifier field 15, is found. Then the application may be installed in the device with the found attribute certificate controlling the interface unit 4 via the security manager 7.

The file structure 10 may be built in the device 1 at the manufacturer, e.g. in the flash memory 5. However, storage in a smart card 6, such as a SIM card, gives certain advantages. The attribute certificate can be built into the smart card at the manufacturer thereof or may also be downloaded over the air into the smart card. This enables a telephone operator to change root certificates and attribute certificates in the SIM card, e.g. by using a special toolkit, the SIM-AT (SIM Application Toolkit).

Thus, the present invention provides a system for downloading applications into mobile devices over the air in a secure manner. The invention has several advantages:

The cross reference problem is solved since an attribute certificate can be cross-referenced with the root certificate.

By storing the attribute certificate along with other critical certificates in the trusted certificate directory file, which inherently is write protected, the problem of storing the attribute certificate in a write protected environment is solved.

Since a certificate authority signs attribute certificates, they have a built-in security mechanism. This enables a secure opportunity to download the certificates over the air.

Over the air download of the attribute certificates linked to root certificates could be done in the same way as signed root certificates are downloaded in the WPKI (Wireless Public Key Infrastructure).

Attribute certificates have the potential of being linked to more than one root certificate. This means that authorisation information/permissions can be linked to any certificate in the certificate chain. It can even be linked to something else than an identity carried in a certificate.

The invention can be applied in portable radio communication such as mobile telephones, pagers, communicators, electronic organisers, smartphones and the like. The scope of the invention is only limited by the claims below.

The invention claimed :

1. A method for loading an application into a device, comprising:
    preloading an attribute certificate into the device, the attribute certificate defining a generic profile, applicable to one or more applications, of access rights to at least one of the functional units of the device, the preloaded attribute certificate being disassociated with applications;
    downloading the application with a signature to the device;
    coupling the signature of the application to a root certificate stored in the device that links the application to the preloaded attribute certificate stored in the device;
    installing the application coupled to said attribute certificate to define a profile of access rights that the application has to the at least one of the functional units of the device; and
    using an application interface to restrict access of the application to only the at least one of the functional units of the device that are allowed by the defined profile of access rights for the application.

2. A method according to claim 1, wherein coupling the signature comprises:
    coupling the signature of the application to the preloaded attribute certificate.

3. A method according to claim 2, further comprising:
    authenticating the application against the stored root certificate.

4. A method according to claim 2 wherein the preloaded attribute certificate and the root certificate are stored in files and are linked by having an equal value in their respective file properties.

5. A method according to claim 4, the preloaded attribute certificate and the root certificate are stored in a PKCS#15 structure.

6. A method according to claim 1, wherein the preloaded attribute certificate is stored in a flash memory.

7. A method according to claim 1, wherein the preloaded attribute certificate is stored in a smart card.

8. A method according to claim 7, wherein the smart card is a SIM card.

9. A method according to claim 8, wherein the preloaded attribute certificate and the root certificate are changeable by means of a SIM application tool kit.

10. A device comprising:
an application toolkit adapted for preloading an attribute certificate into the device, the attribute certificate defining a generic profile, applicable to one or more applications, of access rights to at least one of the functional units of the device, the preloaded attribute certificate being disassociated with applications;
a receiver adapted for downloading an application with a signature to the device;
a security manager adapted for coupling the signature of the application to a root certificate stored in the device that links the application to the preloaded attribute certificate stored in the device;
the security manager being further adapted for installing the application coupled to said attribute certificate to define a profile of access rights that the application has to the at least one of the functional units of the device; and
an interface for using an application interface to restrict access of the application to only the at least one of the functional units of the device that are allowed by the defined profile of access rights for the application.

11. A device according to claim 10, wherein the security manager is further configured to couple the signature of the application to the preloaded attribute certificate.

12. A device according to claim 11, wherein the preloaded attribute certificate and the root certificate are stored in files and are linked by having an equal value in their respective file properties.

13. A device according to claim 12, wherein the preloaded attribute certificate and the root certificate are stored in a PKCS#15 structure.

14. A device according to claim 11, wherein the security manager is further configured to authenticate the application and to link the application to a stored root certificate.

15. A device according to claim 10, further comprising:
a flash memory for storing the preloaded attribute certificate.

16. A device according to claim 10, wherein the device is connectable to a smart card for storing the preloaded attribute certificate 17. A device according to claim 16, wherein the smart card is a SIM card.

18. A device according to claim 17, wherein the preloaded attribute certificate and the root certificate are changeable by means of the application tool kit.

19. A device according to claim 10, wherein the device is a mobile telephone.

20. A device comprising:
a smart card;
means for storing and executing applications in connection with functional units of the device;
means for storing at least one predefined attribute certificate in the smart card defining a generic profile, applicable to one or more applications, of access rights to at least one of the functional units of the device, the at least one predefined attribute certificate being disassociated with the applications;
means for downloading an application with a signature to the device;
means for coupling the signature of the application to a root certificate stored in the device that links the application to the at least one predefined attribute certificate stored in the device, the at least one predefined attribute certificate defining a profile of access rights that the application is allowed to have to the at least one of the functional units of the device; and
an application interface that restricts access the application to only the at least one of the functional units of the device that are allowed by the profile of access rights for the application that is defined by the at least one predefined attribute certificate stored in the smart card.

21. A smart card according to claim 20, wherein the predefined attribute certificate and the root certificate are stored in files and are linked by having an equal value in their respective file properties.

22. A smart card according to claim 20 wherein the predefined attribute certificate and the root certificate are stored in a PKCS#15 structure.

23. A smart card according to claim 20, wherein the predefined attribute certificate and the root certificate are changeable by means of a SIM application tool kit.

* * * * *

UNITED STATES PATENT AND TRADEMARK OFFICE
CERTIFICATE OF CORRECTION

| | | |
|---|---|---|
| PATENT NO. | : 7,900,048 B2 | Page 1 of 1 |
| APPLICATION NO. | : 10/513833 | |
| DATED | : March 1, 2011 | |
| INVENTOR(S) | : Andersson | |

It is certified that error appears in the above-identified patent and that said Letters Patent is hereby corrected as shown below:

On the Title Page:

Item (30) Foreign Application Priority Data:   Please correct "02445054"
to read -- 02445054.6 --

In The Claims:

Column 6, Claim 20, Line 33:   Please correct "restricts access the application"
to read -- restricts access by the application --

Signed and Sealed this
Fifteenth Day of November, 2011

David J. Kappos
*Director of the United States Patent and Trademark Office*